Figure 1:
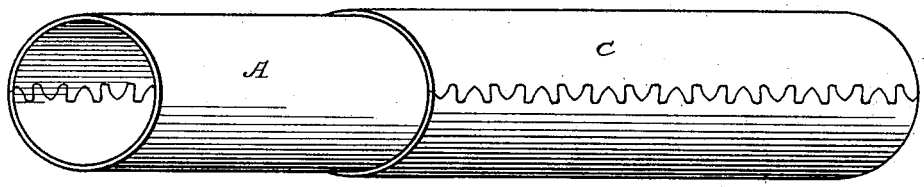

No. 621,730. Patented Mar. 21, 1899.
F. A. WILMOT.
METAL TUBE.
(Application filed Jan. 27, 1899.)

(No Model.) 2 Sheets—Sheet 1.

WITNESSES
H. A. Lamb
S. V. Heley

INVENTOR
Frank A. Wilmot
By A. M. Wooster
Atty.

No. 621,730. Patented Mar. 21, 1899.
F. A. WILMOT.
METAL TUBE.
(Application filed Jan. 27, 1899.)

(No Model.) 2 Sheets—Sheet 2.

WITNESSES
H. A. Lamb
S. V. Hley

INVENTOR
Frank A. Wilmot
By A. M. Wooster
Atty.

UNITED STATES PATENT OFFICE.

FRANK A. WILMOT, OF BRIDGEPORT, CONNECTICUT.

METAL TUBE.

SPECIFICATION forming part of Letters Patent No. 621,730, dated March 21, 1899.

Application filed January 27, 1899. Serial No. 703,591. (No model.)

*To all whom it may concern:*

Be it known that I, FRANK A. WILMOT, a citizen of the United States, residing at Bridgeport, county of Fairfield, State of Connecticut, have invented a new and useful Metal Tube, (Case A,) of which the following is a specification.

My invention relates to metal tubing formed from blanks having their edges provided with projections and recesses which are caused to interknit—as, for example, the various classes of interlocking toothed tubing or the class of tubing now made in large quantities in various metals and which is known to the trade as "clencher" tubing, said tubing and the method of uniting the edges of the strip of metal from which it is formed being described and claimed in Letters Patent Nos. 578,799, 578,800, and 578,801, granted to me March 16, 1897; and my present invention has for its object to produce a tube which may be termed a "veneered" or a "multiple" or "built-up" tube, in which the principle of the interknit teeth, either interlocking or clencher, as preferred, shall be utilized in producing a comparatively inexpensive tubing of great strength, either of the layers of which may be made of any desired metal or alloy. For example, any suitable form of inexpensive tubing may be covered with an outer layer of aluminium, brass, or any preferred metal or alloy, the inner tube being used as a mandrel about which the outer tube is closed by circumferential compression, or if a tube having a non-corrosive interior is required—for example, a pneumatic mail-tube—an outer tube of steel or other suitable metal is formed from a blank having interlocking or clencher teeth upon its edges by closing said blank by circumferential compression about an inner tube of aluminium, brass, or any suitable non-corrosive metal or alloy, the inner tube serving as a mandrel. If the inner tube is too light to serve as a mandrel for compressing an outer tube about it, the inner tube may be supported by a rod. It is important that the circumferential compression of the outer tube upon the inner tube should be effected without appreciable elongation of the outer tube, which is unavoidable if the compression of the outer tube is produced by drawing the tubes through dies or rolls, as it has not been found practicable to stretch the projections and recesses evenly, the result when the compression is produced by drawing being that the projections do not fit snugly in the recesses, and it is impossible to make a satisfactory joint.

My invention enables me to provide for various uses—as, for example, for making bicycles, bayonet-scabbards, bedsteads, chairs, and other articles of furniture, curtain-rods, tent-poles, water, gas, and steam pipes, and pneumatic tubes—a strong and handsomely-finished tubing at a very much less cost of production than has heretofore been possible by any known process of manufacture. This is especially true of tubing having an inner or an outer layer of aluminium, as I am informed and believe that it has heretofore been impossible to produce commercially sheet-metal aluminium tubing, owing to the fact that aluminium and alloys containing a large percentage of aluminium cannot as a rule be successfully brazed or soldered, the commonly-accepted explanation being that when exposed to dampness galvanic action takes place at the joints, which is almost invariably followed by oxidation. I find it perfectly feasible, however, to produce a multiple or built-up tube either the inner or outer layer of which, or both, shall be aluminium or an alloy of aluminium by means of the interlocking or the clencher principle, the inner tube, no matter of what metal it is made, being utilized as a mandrel about which to close an outer tube having its edges provided with either interlocking or clencher projections and recesses.

The essential feature of my present invention is that without regard to the material or the method of making of the inner tube or to the material of the outer tube the outer tube is formed from a blank of sheet metal having its edges provided with projections and recesses, and that the outer tube is closed about the inner tube with great pressure by circumferential compression, but without appreciable elongation of the tube or increase in the width of the recesses in excess of the width of the teeth, thus distinguishing my novel multiple or built-up tubing from tubing made by placing one completed tube over another tube and compressing the outer tube upon the inner tube by drawing them through dies or rolls, thereby elongating the outer tube.

Figure 2:
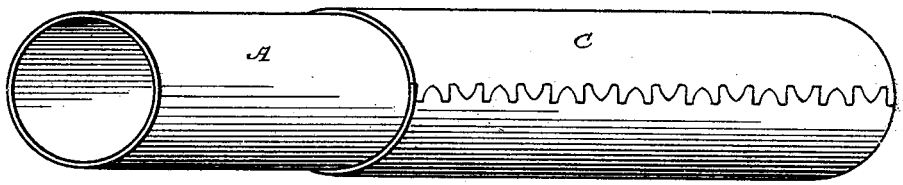
Figure 3:
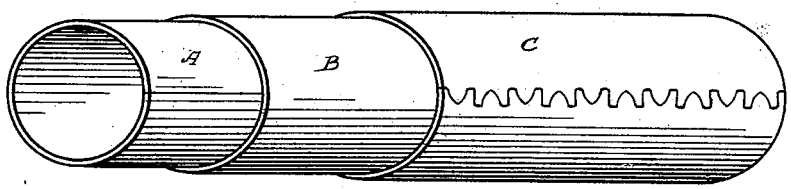
Figure 4:
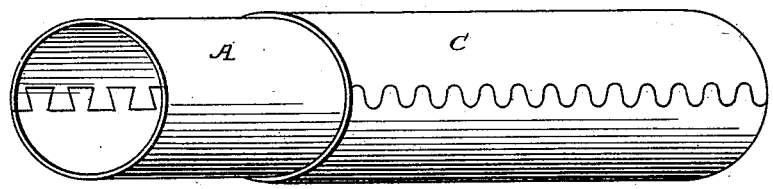
Figure 5:
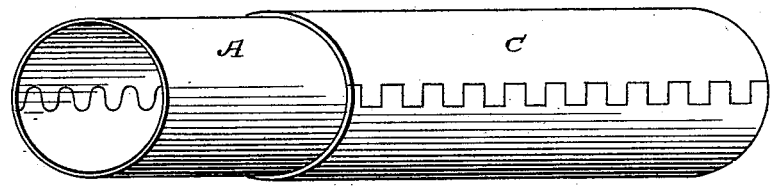
Figure 6:
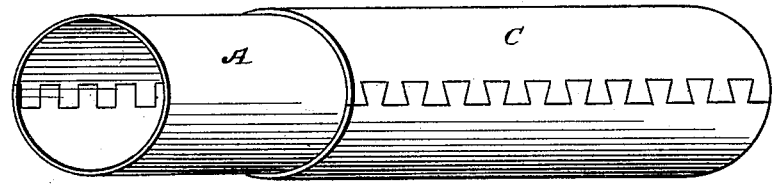

In the accompanying drawings, forming part of this specification, Figure 1 is a perspective of a piece of my novel tubing, both inner and outer tubes being shown as provided with clencher-joints; Fig. 2, a similar view in which the inner tube has no joint, indicating that it may be a drawn tube; Fig. 3, a similar view in which the built-up tube consists of three independent tubes, the inner tube having a butt-joint and no joint appearing in the intermediate tube, as it is a matter of no consequence whatever, so far as my invention is concerned, whether the intermediate tube is a drawn tube or a cast tube or a butt-jointed, a lap-jointed, or an interlocking or clencher jointed tube; and Figs. 4, 5, and 6 are similar views illustrating forms of interlocking toothed joints not embodying the clencher principle.

A denotes the inner, C the outer, and B an intermediate tube or tubes, which may or may not be used, as preferred.

The inner tube may be made in any suitable manner or of any preferred material, it being contemplated, of course, that one tube be made as cheaply as possible consistent with the use to which the tube is to be placed. It will be apparent, therefore, that so far as the principle of my invention is concerned one of the tubes may be a cast tube or a drawn tube or a jointed tube and that if a jointed tube be used the style of joint is wholly immaterial—that is to say, the joint may be a butt or a lap or an interlocking or a clencher joint or any style of joint that may be adapted for the special use to which the tube is to be placed.

The intermediate tube, if used, may be of any suitable material and may or may not be jointed, as preferred.

The outer tube may be made of any special metal or alloy that is required for the exterior of the finished tube—as, for example, steel, brass, or aluminium. This outer tube is made in the form of a blank or strip of sheet metal having upon its edges a continuous series of interlocking or clencher projections and recesses.

In manufacturing my novel tubing the edges of the blank from which the outer tube is formed are closed together, the inner tube or tubes serving as a mandrel and the blank for the outer tube being compressed about the inner tube with great pressure applied circumferentially, but without appreciable elongation of the tube or change in the relative width of the projections and recesses, so that the outer tube is closed firmly upon the inner tube and is practically immovable thereon. If the inner tube is a jointed tube, no matter whether the joint is required to be water or steam tight or not, the joints are preferably placed out of alinement with each other—for example, opposite to each other, as indicated in the drawings for convenience in illustration.

Having thus described my invention, I claim—

1. Metal tubing consisting of an inner tube and an outer tube formed from a blank of sheet metal having upon its edges projections and recesses, said outer tube being closed about the inner tube by circumferential compression only so that the projections upon the edges of the blank are caused to interknit and lock the edges of the blank firmly together and cause it to clasp the inner tube rigidly substantially as described.

2. Metal tubing consisting of an inner tube formed from a blank of sheet metal the edges of said blank being secured together in any suitable manner and an outer tube formed from a blank of sheet metal having upon its edges projections and recesses which are adapted to interknit said joints being placed out of alinement and the outer tube being closed about the inner tube by circumferential compression only, substantially as and for the purposes set forth.

3. Metal tubing consisting of an inner tube formed from a blank of sheet metal, the edges of said blank being secured together in any suitable manner, and an outer tube formed from a blank of sheet metal having upon its edges projections and recesses, said outer tube being closed about the inner tube, by circumferential compression only, so that the teeth upon the respective edges of the blank will be caused to interknit and the inner tube will be tightly clasped.

4. Metal tubing consisting of an inner tube formed from a blank of sheet metal the edges of which are provided with interlocking projections and recesses which are closed together and caused to interknit by circumferential compression only and an outer tube also formed from a blank of sheet metal having upon its edges interlocking projections and recesses said outer tube being closed about the inner tube by circumferential compression only, so that the teeth upon the respective edges of the blank will be caused to interknit and the outer tube will clasp the inner tube rigidly.

5. Metal tubing consisting of an inner tube and an outer tube formed from a blank of sheet metal having upon its edges projections and recesses adapted to interlock and also to clench, said outer tube being closed about the inner tube by circumferential compression only and metal of certain of the teeth being displaced laterally in alternate opposite directions causing said teeth to clench, and the outer tube to clasp the inner tube rigidly.

6. Metal tubing consisting of an inner tube formed from a blank of sheet metal the edges of which are provided with projections and recesses adapted to interlock and also to clench, said edges being closed together by circumferential compression only and an outer tube also formed from a blank of sheet metal having upon its edges projections and recesses adapted to interlock and also to clench, said outer tube being closed about the inner tube by circumferential compression only, so that the teeth upon the respective edges of the blank will be caused to clench and the inner tube will rigidly clasp the outer tube.

In testimony whereof I affix my signature in presence of two witnesses.

FRANK A. WILMOT.

Witnesses:
   A. M. WOOSTER,
   S. V. HELEY.